United States Patent [19]

Sakuma et al.

[11] Patent Number: 4,541,173
[45] Date of Patent: Sep. 17, 1985

[54] AUTOMATIC FILM LOADING DEVICE

[75] Inventors: Takeyuki Sakuma, Hachioji; Masaji Nakamura, Hino; Matsuo Mizukoshi, Hachioji, all of Japan

[73] Assignee: Konishiroku Photo Industry Co., Ltd., Tokyo, Japan

[21] Appl. No.: 467,751

[22] Filed: Feb. 18, 1983

[30] Foreign Application Priority Data

Feb. 27, 1982 [JP] Japan .............................. 57-28760[U]

[51] Int. Cl.[4] ............................................ B23P 19/00
[52] U.S. Cl. ...................................................... 29/806
[58] Field of Search ......................... 29/806, 709, 407; 361/173

[56] References Cited

U.S. PATENT DOCUMENTS

| | | | |
|---|---|---|---|
| 3,135,950 | 6/1964 | Finkle | 361/173 |
| 3,802,051 | 4/1974 | Andler et al. | 29/806 |
| 3,829,947 | 8/1974 | Nakamura et al. | 29/806 |
| 3,857,153 | 12/1974 | Takiguchi et al. | 29/806 |
| 4,346,427 | 8/1982 | Blisset et al. | 361/173 |

Primary Examiner—Howard N. Goldberg
Assistant Examiner—Steven Nichols
Attorney, Agent, or Firm—James E. Nilles

[57] ABSTRACT

An automatic film loading device for loading a sheet of film into a cassette wherein the cassette is discharged out of a system with cassette lid closed if the sheet of film is loaded into the cassette, and with the cassette lid kept open when the sheet of film is not loaded into the cassette. An element for detecting the presence of a sheet of film in the cassette is provided. The element consists of an infrared light emitting element and an infrared light receiving element. An element for detecting the size of the cassette inserted into the device is provided. Guide plates supporting both sides of the cassette and movable symmetrically against the both sides of the cassette are provided.

10 Claims, 7 Drawing Figures

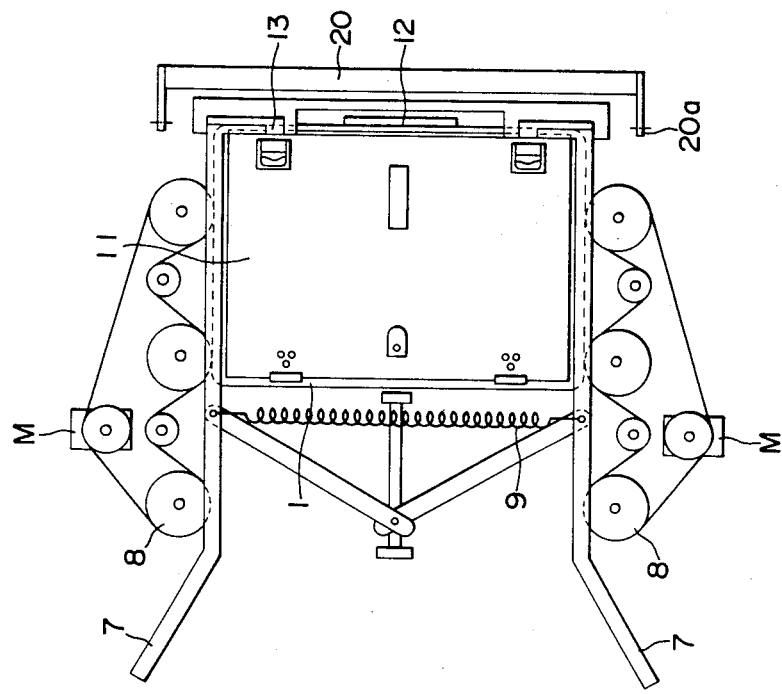
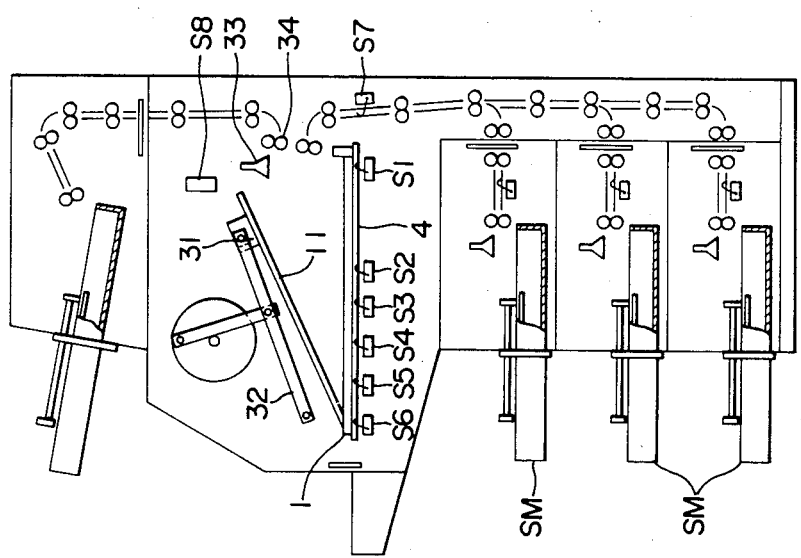

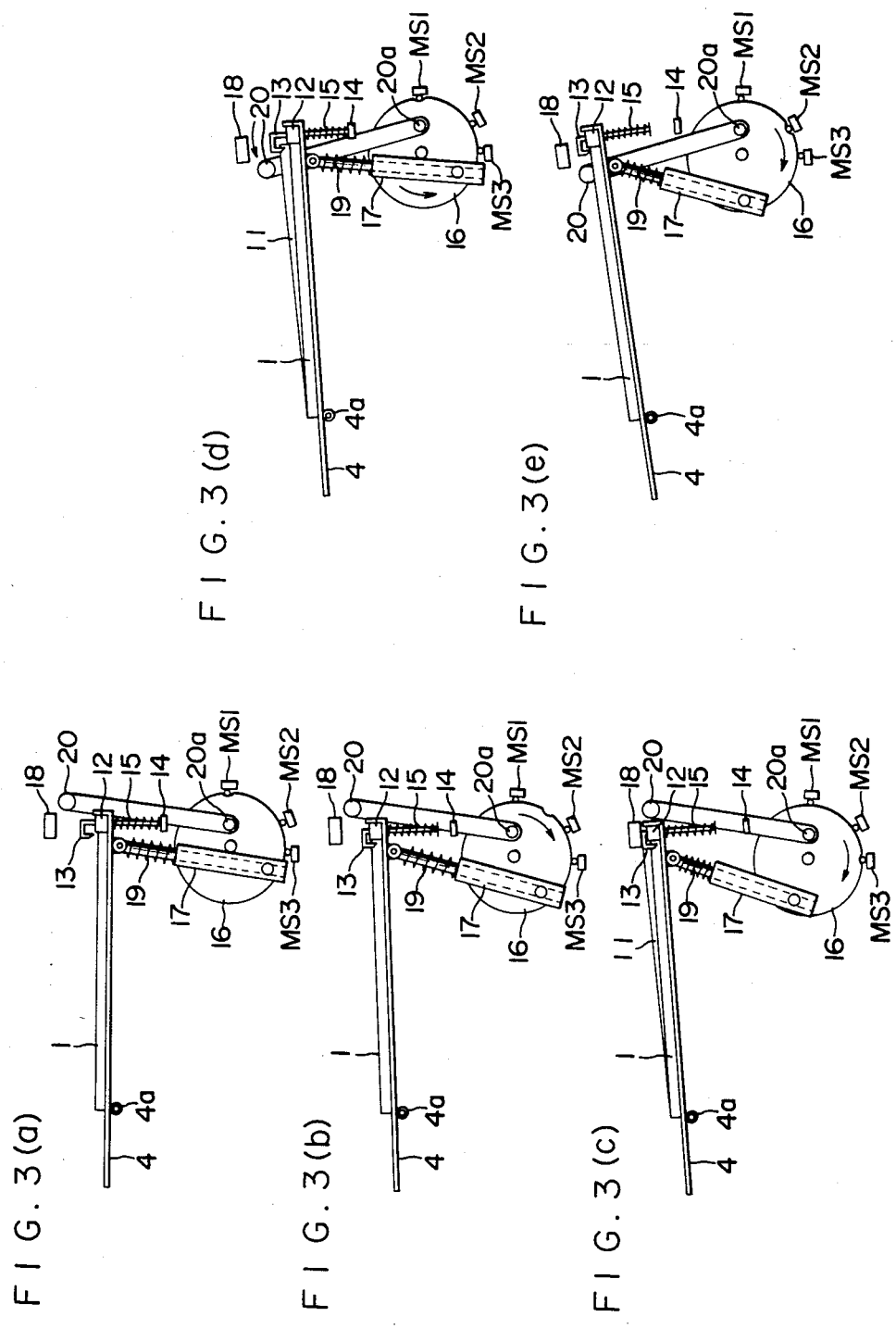

AUTOMATIC FILM LOADING DEVICE

BACKGROUND OF THE INVENTION

1. Field of the Invention

This invention relates to an improvement in an automatic film loading device which loads sheet film into a cassette.

2. Description of the Prior Art

In an X-ray photographic system using a cassette, it is the customary practice to manually load a sheet of film into a cassette inside a dark room, and then return to the dark room to remove the exposed film from the cassette for subsequent development after the X-ray photograph has been exposed. To take another X-ray photograph, it is necessary to manually load a fresh sheet of film into the cassette and the above sequence of operations must be repeated. The applicant of the present invention previously devised a sheet film loading and unloading device which eliminated the necessity of the operations inside the dark room and made it possible to load and unload the film in the light, and filed the invention as Japanese Utility Model Application No. 158186/1980. In an X-ray photographic system using this prior art device, after the sheet of film inside the cassette is removed from the cassette in the light, a fresh sheet of film is loaded, the lid of the cassette is closed and the cassette is then discharged from the system. Though the prior art is advantageous in that it frees the operator of the system from the need of operations in the dark room, it involves the problem that the cassettes discharged from the system are always discharged with their lids closed. In other words, there is no problem so long as there really is a sheet of film in the cassette, but if the sheet of film is not loaded into a cassette for some reason, the cassette is still discharged with its lid closed so that the operator of the system is always uncertain as to whether or not a fresh film has actually been loaded into a cassette discharged with its lid closed.

SUMMARY OF THE INVENTION

It is therefore an object of the present invention to provide an automatic film loading device which eliminates the uncertainty of the operator of the system by discharging a cassette unlocked if no film has been loaded into the cassette, and discharging a cassette locked if a sheet of film has actually been loaded into the cassette.

In an automatic film loading device for loading a sheet of film into a cassette, the object of the present invention can be accomplished by an automatic film loading device in which the cassette is discharged out of the system with its lid closed if a sheet of film has actually been loaded into the cassette, and with its lid open if no sheet of film has been loaded into the cassette.

Other objects and features of the present invention will become more apparent from the following description to be taken in conjunction with the accompanying drawings.

BRIEF DESCRIPTION OF THE DRAWINGS

FIG. 1 is a side view of the system as a whole in accordance with the present invention;

FIG. 2 is a plan view of the cassette;

FIGS. 3(a) through 3(e) are side views showing the cassette at different stages during the sequence of operations.

DESCRIPTION OF THE PREFERRED EMBODIMENTS

FIG. 1 is a side view of an embodiment of the present invention. When a cassette 1 with its lid closed is loaded from the left in the drawing and is moved to a predetermined position, a stop detector S1 such as a microswitch is actuated and stops the movement of the cassette. FIG. 2 is a plan view of this state.

The cassette 1 is clamped by a pair of guide plates 7 that are symmetrically moved against both sides of the cassette by a tension spring 9. When the cassette 1 is to be removed, it is moved on a cassette receiving plate 4 by groups of rollers 8 that are rotated by driving motors M. The moving cassette 1 hits a cassette stopper 12. The stop detector S1 is actuated and the cassette is set horizontally while the position of its center is maintained. FIG. 3(a) is a side view of this state. As shown in FIG. 1, a plurality of detectors S2 through S6 are provided on the cassette receiving plate, these detect the size of the cassette 1. A sheet of film whose size matches the size of the cassette 1 is taken out from a supply magazine SM of a plurality of channels provided below the groups of rollers, and waits at the position of a detector S7.

As shown in FIG. 2, opening pawls 13 are fitted to the guide plates 7 of the two side surfaces in such a relative position that they can cope with various sizes of cassettes. As shown in FIG. 3(b), when the cassette tilts, the opening pawls 13 leave lower stoppers 14 and are pushed down by compression springs 15, thereby supporting the frame of the cassette 1. When the cassette 1 is in the horizontal position as shown in FIG. 3(a) the opening pawls 13 are placed on the lower stoppers 14 and when the cassette 1 is being moved and loaded the opening pawls 13 are at the escape position.

Reference numeral 16 represents an eccentric cam which is rotated by a motor which is not shown. A push lever 17 has one of its ends on the eccentric cam 16 and its other end on the underside of the cassette receiving plate 4. According to the rotational position of the eccentric cam 16, therefore, it pushes up the cassette receiving plate 4 about a receiving plate support shaft 4a as the center so as to tilt the cassette 1. p The cassette 1 which is in the horizontal position of FIG. 3(a) is pushed up and tilted by the push lever 17 as the eccentric cam 16 rotates in the clockwise direction. When the cassette 1 tilts, the opening pawls 13 are made to leave the lower stoppers 14 and engage with pawl grooves in the cassette 1 by the force of the compression spring 15. The spring force of the compression spring 15 alone can not release the locks. Since the opening pawls 13 engage with the pawl grooves of the cassette 1, the cassette 1 is prevented from slipping or dropping due to its own weight or by any vibration or impact applied thereto. FIG. 3(b) shows this state.

When the eccentric cam 16 rotates further clockwise, the opening pawls 13 tilt together with the cassette receiving plate 4 because they are attached, and then hit fixed pawl stoppers 18. When the cassette 1 is pushed further up, the opening pawls 13 engage more deeply with the pawl grooves of the cassette 1, thus opening the cassette lid 11. Suitable recesses are defined around the circumferential surface of the eccentric cam 16, when a microswitch MS3 detects one of these recesses, the motor stops. FIG. 3(c) shows this state.

Incidentally, the push lever 17 includes a compression spring 19 and is constructed so as to absorb any excessive force if such a force acts upon its components.

A magnet 31 fitted to the end of a magnet arm 32 shown in FIG. 1 attracts and lifts an iron plate bonded to the cassette lid 11 and thus opens the cassette lid 11 to an angle that does not hinder suction transfer. When the cassette lid 11 is opened, a detector S8 detects whether or not there is a film inside the cassette 1. Detector S8 consists of a combination of infrared light emitting element (LED) and its light receiving element, for example, and detects the presence or absence of the film according to the intensity of reflections from of the internal surface of the cassette 1. When detector S8 determines the presence of a film, the sheet film stored in the cassette 1 is attracted by a sucker 33 and is transferred to a transfer roller 34. After this transfer is completed, another sheet of film that has been waiting at a detector S7 is supplied into the cassette 1. Since the cassette 1 has a suitable inclination, the sheet of film can be reliably loaded at its normal position. The lid is then closed after the film loading is reliably effected in this manner.

When detector S8 detects the loading of a sheet of film into the cassette 1, the eccentric cam 16 rotates counter-clockwise and a microswitch MS1 detects a recess in the circumference of the eccentric cam 16 and stops the motor so that the cassette receiving plate 4 reaches the horizontal position. FIG. 3(d) shows this state.

At this point, a push roller 20 which rocks about a support shaft 20a as its center is pushed down in the direction indicated by the arrow, and the eccentric cam 16 again rotates clockwise so that the push lever 17 is pushed up and the lid 11 of the cassette 1 is locked by the push roller 20 and push lever 17. FIG. 3(e) shows this state.

At this position, the eccentric cam 16 is stopped in its pushing operation by the detection by a microswitch MS2 and again rotates counter-clockwise and is stopped by the detection by the microswitch MS1 at the position where the cassette receiving plate 4 becomes horizontal. The push roller 20 returns to its original position, thereby reaching the state shown in FIG. 3(a).

The cassette 1 is then delivered from the predetermined position described above by the rotation of the driving motors M and the rollers 8 driven by the motors M.

If there is no sheet of film according to the size of the cassette 1 inside the supply magazines, or if the supply film is not delivered to the cassette 1 due to a transfer error, detector S8 will detect the absence of the sheet of film inside the cassette 1. Upon this detection by detector S8, the cassette 1 is delivered from the predetermined position with its lid open by the rotation of the driving motors M and the rollers 8 driven by the motors M, without the eccentric cam 16 rotating clockwise.

As described above, the automatic film loading device in accordance with the present invention discharges the cassette out of the system without closing the cassette lid (without locking it) if no film is loaded into the cassette, but when film is supplied to the cassette the device closes and locks the cassette lid and then discharges the cassette out of the system.

With the device of the present invention, it is no longer necessary for the operator of the system to have doubts concerning whether or not the sheet of film is loaded into the cassette. Hence, the operator is now freed from a psychological burden.

What is claimed is:

1. An automatic film loading device characterized by comprising:
   means for stopping at a predetermined position the movement of a first cassette consisting of a lid and a main body, which is inserted in a state that said lid is closed and locked into a photographic system;
   means for unlocking the lid;
   means for holding a plurality of cassettes other than said first cassette;
   first means for detecting the size of the first cassette;
   means for taking out of said plural cassettes selectively a sheet of film of a size suitable for said first cassette and loading into said first cassette:
   second means for detecting whether the sheet of film of the size suitable for the first cassette is loaded into the first cassette or not; and
   means for closing and locking the lid of the first cassette, which is operated by an output of said second means only when the sheet of film is loaded into said first cassette, wherein said first cassette is taken out in the unlock state when no sheet of film is loaded in the first cassette.

2. An automatic film loading device as claimed in claim 1, wherein said unlocking means comprises means for tilting said first cassette inserted into the system about one side of the first cassette as a fulcrum, a pawl member provided movably while engaging with an engaging portion of said first cassette, and a stopper member for stopping forcedly the movement of said pawl member while said first cassette is being tilted.

3. An automatic film loading device as claimed in claim 1, wherein said locking means comprises means for tilting said first cassette inserted into the system about one side of the first cassette as a fulcrum, and a pressure means provided opposite to said tilting means with respect to said first cassette.

4. An automatic film loading device as claimed in claim 2, wherein said pawl member can be moved along the forward edge of said first cassette.

5. An automatic film loading device as claimed in claim 1, wherein said second means consists of an element emitting an infra-red light and an element for receiving said light.

6. An automatic film loading device characterized by comprising:
   means for stopping at a predetermined position the movement of a first cassette consisting of a lid and a main body, which is inserted in a state that said lid is closed and closed into a photographic system;
   means for unlocking the lid;
   means for holding a plurality of cassettes other than said first cassette;
   means for detecting whether the sheet of film is loaded into the first cassette with said lid opened or not;
   means for closing and locking the lid of the first cassette, which is operated by an output of said second means only when the sheet of film is loaded into said first cassette; and
   means for discharging out of the system said first cassette;
wherein said first cassette is taken out in the unlock state when no sheet of film is loaded into said first cassette.

7. An automatic film loading device as claimed in claim 6, wherein said discharging means is compatible with cassette loading means.

8. An automatic film loading device as claimed in claim 6, wherein said unlocking means comprises means for tilting said first cassette inserted into the system about one side of the first cassette as a fulcrum, a pawl member provided movably while engaging with an engaging portion of said first cassette, and a stopper member for stopping forcedly the movement of said pawl member while said first cassette is being tilted.

9. An automatic film loading device as claimed in claim 6, wherein said locking means comprises means for tilting said first cassette inserted into the system about one side of the first cassette as a fulcrum, and a pressure means provided opposite to said tilting means with respect to said first cassette.

10. An automatic film loading device as claimed in claim 8, wherein said pawl member can be moved along the forward edge of said first cassette.

* * * * *